United States Patent [19]

James

[11] Patent Number: 4,997,158

[45] Date of Patent: Mar. 5, 1991

[54] MECHANICAL STRAIN ISOLATOR MOUNT

[75] Inventor: Gordon E. James, Rancho Palos Verdes, Calif.

[73] Assignee: The United States of America as represented by the Administrator, of the National Aeronautics and Space Administration, Washington, D.C.

[21] Appl. No.: 441,673

[22] Filed: Nov. 27, 1989

[51] Int. Cl.⁵ ............................................. F16M 13/00
[52] U.S. Cl. ..................................... 248/604; 248/593
[58] Field of Search ............... 248/604, 603, 592, 593, 248/629, 630, 638, 560

[56] References Cited

U.S. PATENT DOCUMENTS

| | | |
|---|---|---|
| 2,936,140 | 5/1960 | Copeland . |
| 3,317,166 | 5/1967 | Janssen . |
| 3,506,226 | 4/1970 | Blomgren . |
| 4,076,197 | 2/1978 | Dochterman . |
| 4,155,529 | 5/1979 | Maudlin . |
| 4,200,257 | 4/1980 | Litch, III . |
| 4,230,291 | 10/1980 | Marshall, II . |
| 4,372,520 | 2/1983 | Shutt .................................. 248/604 |
| 4,683,520 | 7/1987 | Grassens et al. ................ 248/629 X |

Primary Examiner—Alvin C. Chin-Shue
Attorney, Agent, or Firm—George F. Helfrich; Harold W. Adams; John R. Manning

[57] ABSTRACT

A mechanical strain isolator mount 10 is provided to preserve the alignmental integrity of alignment sensitive instrument 25. Alignment sensitive instrument 25 is mounted on rectangular base 11. Flexural legs 15, 16, and 17 are connected at their proximal ends to rectangular base 11 at points, A, B, C, respectively. Flexural legs 15, 16, and 17 are also spaced parallel to sides AB, BC, and CD respectively. Mounting pads 20, 21, and 22 are respectively connected to legs 15, 16, and 17 at the distal ends thereof and attach mechanical strain isolator mount 10 to substrate 30 by means of threaded bolts 23. When a mounting pad and its respective leg is subjected to lateral strains in either the X or Y directon via substrate 30, the respective leg relieves the strain by bending in the direction of the strain. An axial strain on a mounting pad in the Z direction is relieved by a rotational motion of legs 15, 16, and 17 in the direction of the strain. When substrate 30 is stress free, the flexural legs return to their original condition and thus preserve the original alignmental integrity of alignment sensitive instrument 25.

3 Claims, 1 Drawing Sheet

MECHANICAL STRAIN ISOLATOR MOUNT

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates generally to strain isolation and more specifically to a mechanical strain isolation mount for highly alignment sensitive devices.

2. Description of the Related Art

Certain devices such as optical instruments must preserve their alignmental integrity after being subjected to high stress levels. For example, an optical instrument may be subjected to loads exceeding 50 g during the launch of a space shuttle. A current method of mounting optical instruments is to bolt the instrument to a main frame. Such a method is inapplicable to high load and subsequent stress levels experienced during a shuttle launch. The instrument can slide or creep when the main frame surface stresses exceed 500 pounds per square inch as the mount bolts deform, resulting in misalignment. Also, a state-of-the-art tangent bar consisting of an equilateral triangular base with legs mounted at the midpoint of each side is inappropriate. Each leg has mount pads which are bolted to the strained surface. A load along a leg will load the bolts and cause undesirable creep.

Accordingly, it is an object of the present invention to preserve the alignmental integrity of a highly alignment sensitive device which is subjected to high stresses.

It is a further object of this invention to accomplish the above object simply and inexpensively.

Other objects and advantages of this invention will become apparent hereinafter in the specification and drawings which follow.

SUMMARY OF THE INVENTION

According to the present invention, the foregoing and additional objects are attained by providing a mechanical strain isolator mount. This mount consists of a rectangular base to which the alignment sensitive instrument is attached. Three flexural legs are formed to three different corners of the base. These legs are also spaced parallel to three different sides of the base. A mounting pad is connected to each leg. These pads allow the mechanical strain isolation mount to be mounted to the substrate to be stressed. During stress, six degree-of-freedom relative motion between the pads is accommodated. Lateral strain is relieved in four directions by bending of the flexural legs. Axial strain is relieved in two directions by rotation of the base as the legs move. Accordingly, shear loads at the interface between the pads and the stressed surface are reduced and no slipping occurs. Also, when the substrate is stress free, the flexural legs return to their original shape. Accordingly, the alignmental integrity of the alignment sensitive instrument is preserved.

DESCRIPTION OF THE PREFERRED EMBODIMENTS

Figure 1:
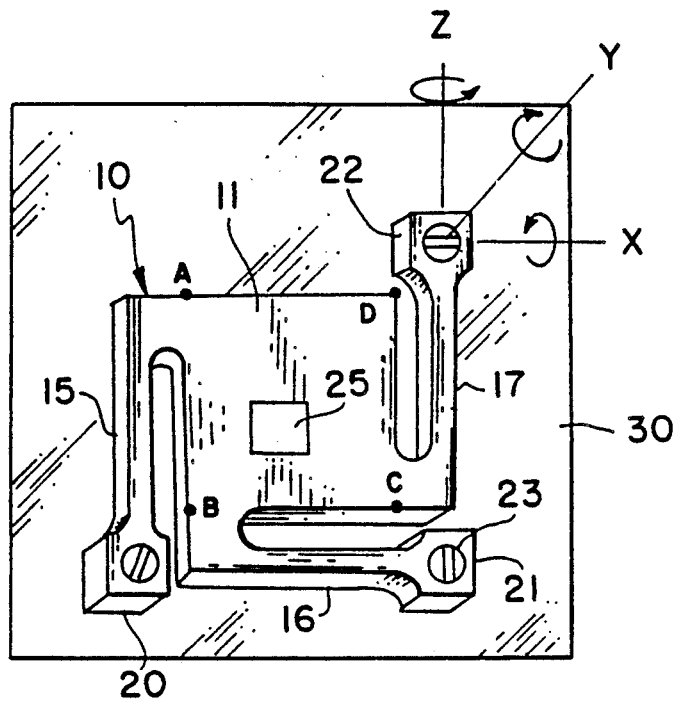
FIG. 1 is a pictorial view of a strain isolator mount according to the present invention comprising a rectangular base and three flexural legs which are connected to three different corners of the base and are parallel to three different sides of the base.

Referring now to FIG. 1, a mechanical strain isolator mount 10 comprising a rectangular base 11 and flexural legs 15, 16, and 17 is shown. Alignment sensitive instrument 25 is mounted on rectangular base 11 in the desired position. Alignment sensitive instrument 25 may be an optical instrument, for example. Conventional mounting such as bolts or adhesives may be used. Strength is not determinative of the mounting selected since rectangular base 11 will be isolated from strain. Rectangular base 11 is comprised of sides AB, BC, CD, and DA. Flexural leg 15 is connected at one end to rectangular base 11 at point A and is spaced parallel to side AB. Flexural leg 16 is connected at one end to rectangular base 11 at point B and is spaced parallel to side BC. Flexural leg 17 is connected at one end to rectangular base 11 at point C and is spaced parallel to side CD.

Mounting pad 20 is connected to the distal end of flexural leg 15. Mounting pad 21 is connected to the distal end of flexural leg 16. Mounting pad 22 is connected to the distal end of flexural leg 17. Mounting pads 20, 21, and 22 are attached to substrate 30, preferably to threaded bolts 23.

Rectangular base 11, flexural legs 15, 16, and 17, and mounting pads 20, 21, and 22 are advantageously constructed of the same material. Thus, mechanical strain isolator mount 10 may be machined from a single piece of any construction material. Examples of acceptable construction materials include aluminum-titanium and stainless steel. These materials have a moduli of elasticity of $10 \times 10^6$ pounds per square inch and $30 \times 10^6$ psi, respectively. The coefficient of thermal expansion of strain isolator mount 10 should match that of substrate 30.

The length of the flexural legs 15, 16, and 17 and their respective spacings with sides AB, BC, and CD depend upon the range of strains to which mechanical strain isolator mount 10 is subjected.

Figure 2:
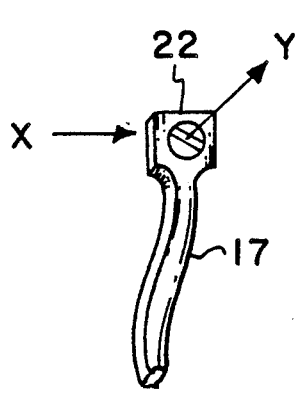
FIG. 2 is a pictorial view of one flexural leg of FIG. 1 bending to relieve lateral strains in two directions.
Figure 3:
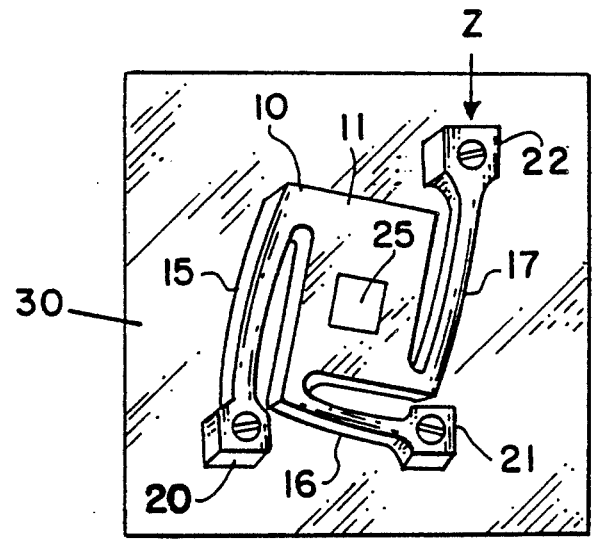
FIG. 3 is a pictorial view of the strain isolator mount of FIG. 1 rotating to relieve an axial strain on one of the flexural legs of FIG. 1.

When substrate 30 is stressed, mechanical strain isolator mount 10 maintains the alignment integrity of alignment sensitive instrument 25. Referring now to FIG. 2, lateral strains on mounting pad 22 in either direction X or direction Y are relieved by a flexural bending of flexural leg 17 in the direction of the lateral strain. Likewise, lateral strain one mounting pads 20 and 21 may be relieved by flexural legs 15 and 16. Referring now to FIG. 3, an axial strain on mounting pad 22 in direction Z is relieved by a rotation of rectangular base 11 about the Y axis as flexural legs 15, 16 ad 17 bend. Likewise, axial strains on mounting pads 20 and 21 may be relieved in the same manner. Thus, mechanical strain isolator mount 10 accommodates six degree-of-freedom relative motion between mounting pads 20, 21, and 22. Accordingly, bolts 23 are not subjected to high stresses. Once substrate 30 is stress free, flexural legs 15, 16, and 17 return to their original pre-stress state. Thus, the alignmental integrity of alignment sensitive instrument 25 is preserved by mechanical strain isolator mount 10.

What is claimed is:

1. A mechanical strain isolator mount for the mounting of an alignment sensitive instrument comprising:
    a rectangular base;
    a means for mounting the alignment sensitive instrument into a first alignment position on said rectangular base;
    three flexural legs, each leg attached at a proximal end to a different corner of said rectangular base and each leg, where attached, spaced parallel to a different side of said rectangular base;
    three mounting pads, each attached to a distal end of a different flexural leg; and
    a means for attaching each of said mounting pads to a substrate the is subject to strain,
    whereby the alignment sensitive instrument remains in the first alignment position.

2. The mechanical strain isolator mount of claim 1 wherein said rectangular base, flexural legs, and mounting pads are of the same material.

3. The mechanical strain isolator mount of claim 2 wherein said material has a coefficient of thermal expansion which matches the coefficient of thermal expansion of the substrate.

* * * * *